US010650387B2

(12) United States Patent
Colgrave (10) Patent No.: US 10,650,387 B2
(45) Date of Patent: *May 12, 2020

(54) USER ACCESS TO A REGISTRY OF BUSINESS ENTITY DEFINITIONS

(71) Applicant: International Business Machines Corporation, Armonk, NY (US)

(72) Inventor: John Colgrave, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/563,896

(22) Filed: Dec. 8, 2014

(65) Prior Publication Data

US 2015/0095246 A1 Apr. 2, 2015

Related U.S. Application Data

(63) Continuation of application No. 10/561,260, filed as application No. PCT/GB03/05438 on Dec. 12, 2003.

(30) Foreign Application Priority Data

Jun. 26, 2003 (GB) .................................. 0314908.5

(51) Int. Cl.
*G06Q 30/00* (2012.01)
*G06F 21/62* (2013.01)
*G06F 21/60* (2013.01)

(52) U.S. Cl.
CPC ............ *G06Q 30/018* (2013.01); *G06F 21/60* (2013.01); *G06F 21/6245* (2013.01); *G06F 2221/2141* (2013.01)

(58) Field of Classification Search
CPC .............................. G06F 21/10; G06Q 30/018
See application file for complete search history.

(56) References Cited

U.S. PATENT DOCUMENTS

| 5,414,852 A | 5/1995 | Kramer et al. |
| 5,629,980 A | 5/1997 | Stefik et al. |
| (Continued) | | |

FOREIGN PATENT DOCUMENTS

| TW | 530227 | 2/2003 |
| TW | 528956 | 4/2003 |
| (Continued) | | |

OTHER PUBLICATIONS

Karjoth, "The Authorization Service of Tivoli Policy Director," Seventeenth Annual Computer Security Applications Conference, New Orleans, LA, USA, 2001, pp. 319-328. (Year: 2001).

(Continued)

*Primary Examiner* — Jacob C. Coppola
(74) *Attorney, Agent, or Firm* — Steven L. Nichols; Fabian VanCott (57) ABSTRACT

The present invention provides an apparatus, method and computer program product for a registry, such as a UDDI registry, to restrict access to business entity definitions contained in the registry according to permission details associated with the business service definition. A business entity definition may comprise a plurality of information elements. Permission details, which define users or groups of users with permission to access the information element, are then associated with one or more of these information elements. When a user request is received to access a business entity definition access is restricted to only those information elements for which the user has the required permission.

18 Claims, 6 Drawing Sheets

(56) References Cited

U.S. PATENT DOCUMENTS

| | | | |
|---|---|---|---|
| 5,864,871 | A | 1/1999 | McCarthy et al. |
| 5,878,415 | A | 3/1999 | Olds |
| 6,061,684 | A | 5/2000 | Glasser |
| 6,182,142 | B1 | 1/2001 | Win et al. |
| 6,978,376 | B2 * | 12/2005 | Giroux ............... H04L 63/0428 380/277 |
| 7,340,508 | B1 * | 3/2008 | Kasi ................. G06Q 10/10 709/203 |
| 7,380,120 | B1 * | 5/2008 | Garcia ............... G06F 21/6209 713/160 |
| 2002/0046157 | A1 | 4/2002 | Solomon |
| 2002/0077986 | A1 | 6/2002 | Kobata |
| 2002/0174117 | A1 * | 11/2002 | Nykanen ........................ 707/4 |
| 2003/0055878 | A1 | 3/2003 | Fletcher |
| 2003/0061216 | A1 | 3/2003 | Moses |
| 2003/0093436 | A1 | 5/2003 | Brown |
| 2003/0105846 | A1 * | 6/2003 | Zhao .................. H04L 67/16 709/221 |
| 2003/0115548 | A1 * | 6/2003 | Melgar ........................ 715/513 |
| 2003/0187841 | A1 | 10/2003 | Zhang |
| 2003/0191802 | A1 | 10/2003 | Zhao |
| 2003/0220925 | A1 * | 11/2003 | Lior ................. H04L 29/12113 |
| 2004/0030627 | A1 | 2/2004 | Sedukhin |
| 2004/0039738 | A1 * | 2/2004 | Cutlip ............................ 707/5 |
| 2004/0093515 | A1 * | 5/2004 | Reeves, Jr. ......... H04L 63/0807 726/10 |
| 2004/0128345 | A1 * | 7/2004 | Robinson ............... H04L 29/06 709/203 |
| 2004/0139082 | A1 * | 7/2004 | Knauerhase .......... G06F 16/958 |
| 2004/0202330 | A1 * | 10/2004 | Harvey ................. G06F 9/465 380/277 |
| 2004/0213409 | A1 * | 10/2004 | Murto et al. ................... 380/258 |
| 2005/0044197 | A1 * | 2/2005 | Lai .............................. 709/223 |
| 2005/0076135 | A1 * | 4/2005 | Song .................... G06Q 30/06 709/230 |

FOREIGN PATENT DOCUMENTS

| | | |
|---|---|---|
| WO | 9849620 A1 | 11/1998 |
| WO | 2001022299 | 3/2001 |
| WO | WO 0122299 A1 * | 3/2001 |

OTHER PUBLICATIONS

Ching, "Authorization in the digital library: secure access to services across enterprise boundaries," Proceedings of the Third Forum on Research and Technology Advances in Digital Libraries,, Washington, DC, USA, 1996, pp. 110-119.

* cited by examiner

USER ACCESS TO A REGISTRY OF BUSINESS ENTITY DEFINITIONS

FIELD OF THE INVENTION

The present invention relates to user access to a registry, such as a UDDI registry, of business services and more specifically to the user obtaining details of a business service from the registry.

BACKGROUND TO THE INVENTION

Over recent years it has become commonplace for a business to provide the ability for a user to purchase goods from the business using a computer which communicates with a computer of the business. For example a business may provide a web site on the Internet which enables a user to purchase goods from the business over the World Wide Web. Following on from this success it has become a is requirement to more easily locate suitable businesses to deal with and this requirement has been satisfied by the arrival of registry services, such as specified by UDDI (Universal Description, Discovery and Integration), which provide support for business entities which provide services.

A UDDI registry enables a business entity to publish information about the services it provides and a user to discover information about published business services. Accordingly, for example, a user can send a request to the UDDI registry to obtain details of business services which provide a particular service which the user requires. The user then chooses from one or more business services for which details are returned by the UDDI registry and the sends an appropriate request to the chosen business service. However the UDDI registry may return to a user details of a business service which it does not have appropriate permission to access and, as a result, the user will not discover that they cannot access a particular business service until their request to the particular business service is rejected.

This is a waste of time and resource for the user in making a request to a business service which is bound to fail, and a waste of time and resource for the business which provides the service which must handle requests from users which do not have the required permissions to access it. As a result it would be advantageous to provide a method of saving such waste time and resource.

SUMMARY OF THE INVENTION

The present invention addresses this problem by providing means for a registry which hold business entity definitions, such as a UDDI registry, to restrict user access to information in the business definitions to that which the user has permission to access.

According to a first aspect the present invention provides a method for a registry of business entity definitions to handle users requests to access business entity definitions, the method comprising steps of: receiving a request from a user to access a business entity definition; obtaining, from data associated with the request, the identity of the user; determining, from permission details associated with the business entity definition and the identity of the user, whether the user has is permission to access information in the business entity definition; and denying the user access to information in the business entity definition if it is determined that the user does not have permission.

According to a second aspect the present invention provides a registry of business entity definitions for handling requests to access business entity definitions, the registry comprising: means for receiving a request from a user to access a business entity definition; means for obtaining, from data associated with the request, the identity of the user; means for determining, from permission details associated with the business entity definition and the identity of the user, whether the user has permission to access information in the business entity definition; and means for denying the user access to information in the business entity definition if it is determined that the user does not have permission.

According to a fourth aspect the present invention provides a registry service for handling a user requests to access business entity definitions, providing the service comprising the steps of: receiving a request from a user to access a business entity definition; obtaining, from data associated with the request, the identity of the user; determining, from permission details associated with the business entity definition and the identity of the user, whether the user has permission to access information in the business entity definition; and denying the user access to information in the business entity definition if it is determined that the user does not have permission.

According to a third aspect the present invention provides and computer program product comprising instructions which, when run on a data processing host, cause said data processing host to carry out a method according to the first aspect.

The user access request could be to read, update or delete all or a subset of the information contained in a business entity definition. If the request is to read the business service definition it could be a request to read a specific business entity definition or a business entity definition which satisfies search criteria specified in the request. For example the search criteria could be used locate the business entity definition and determine what information in the business entity definition the user wishes to access.

Optionally the business entity definition may comprise a plurality of information elements and permission details are associated with each of these is information elements. As a result the permission details can be used to only deny a user access to those information elements for which the permission details indicate they do not have the required permission. However note that this does not require all information elements in a business entity definition to have associated permission details. Further note that it is not necessary to determine if a user has permission to access all information elements which have associated permission details but only those information elements which the user has requested to access.

If permission details are associated with a plurality of information elements in a business entity definition an access policy can be used which is used to determine whether a user has permission to access an information element using both the permission details associated with the information element and the permission details of a different information element. For example, if the information elements are in a hierarchy such that a first information element contains one or more second information elements access to the first information element can be denied if the user does not have access to all, or a subset, of the second information elements contained within it. Permission details could comprise, for example, identifiers for one or more clients or users, and/or identifiers for one or more client or user groups which have access to the business entity definition, or information elements of the business service definition, with which they are associated.

Further the levels of access an identifier has can also be indicated, for example read, update and delete. Further permission details could be stored in a variety of formats, for example in an Access Control List (ACL) which is a file containing a list of users and access rights for each user.

Preferably permission details are obtained from a file system in which their association with a business entity definition, or information element in the business entity definition, is used to determine their location in the file system. For example, if a unique key is associated with a business entity definition and each information element contained within it, the ACL associated with an information element will be the in a directory defined by the key of a business entity definition and the key of the information element. As a result the permission details can be easily located and the business entity definition does not require updating to contain or refer to permission details. Alternatively permission details could be included in, or referenced from, the business entity definition, or information element in the business entity definition, with which they are associated.

Optionally the registry is a UDDI registry and the information in the business entity definition is a business Entity information element, the business Entity information element containing one or more business Service information elements, each business Service containing one or more binding template information elements and each binding template containing one or more references each referring to a technical model information element.

Optionally the user could be a web user who communicates with the UDDI registry over the internet to obtain details of web services which can be accessed over the internet.

BRIEF DESCRIPTION OF THE DRAWINGS

The invention will now be described, by way of example only, with reference to a preferred embodiment thereof, as illustrated in the accompanying drawings, in which.

DESCRIPTION OF THE PREFERRED EMBODIMENT

Figure 1:
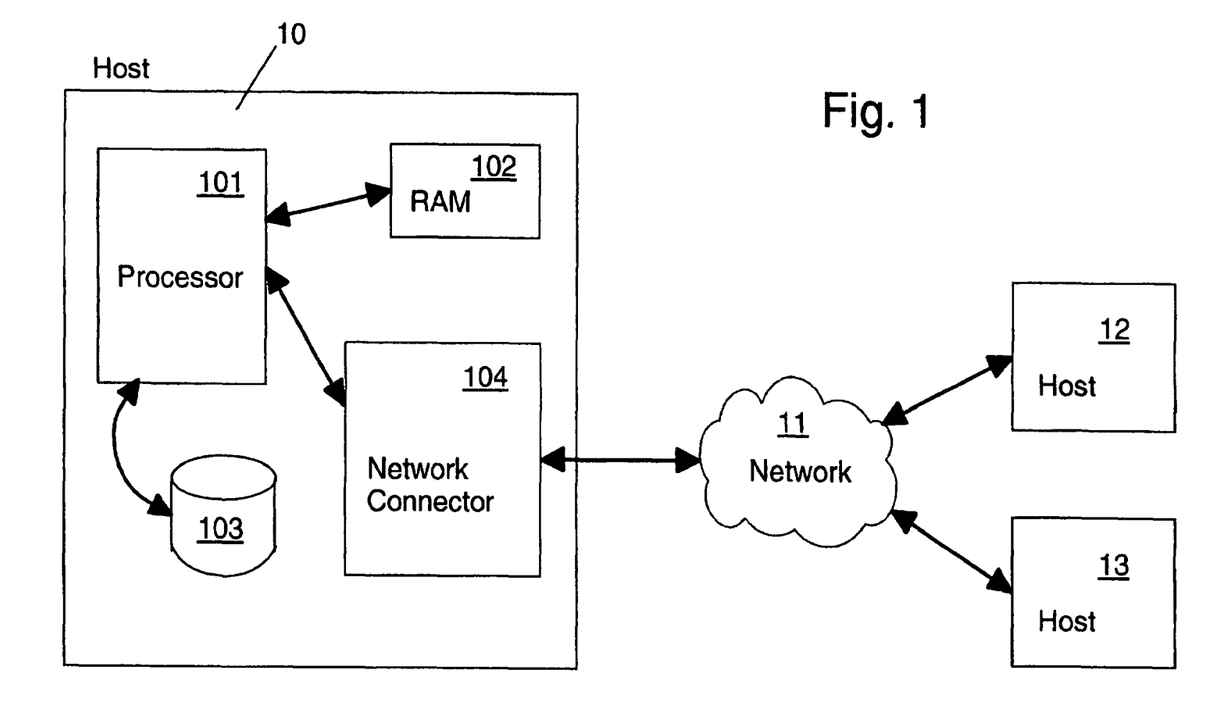
FIG. 1 is a block diagram of a data processing environment in which the preferred embodiment of the present invention can be advantageously applied.

In FIG. 1, a client/server data processing host 10 is connected to other client/server data processing host 12 and 13 via a network 11, which could be, for example, the Internet. In the preferred embodiment a UDDI registry may be installed on any such client/server and accept requests to define/update details of a web service, or obtain details of a web service, from a user using the same or another client/server data processing host. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

The preferred embodiment is discussed in terms of a business entity definition and a UDDI registry according to the UDDI specification. The UDDI specification defines a set of XML schemas which are templates for creating definitions of business entities. As a result a business entity definition may be an instance of one or more these defined XML schemas.

Figure 2:
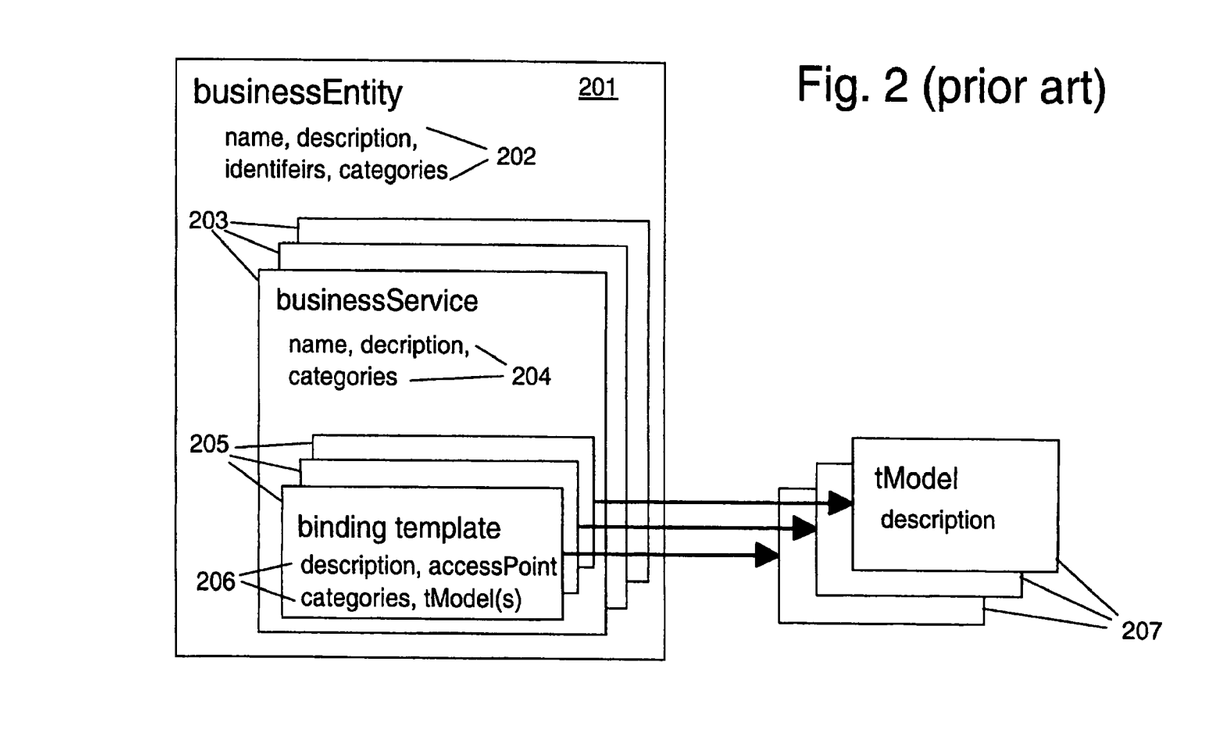
FIG. 2 is a schematic diagram of the main information elements in a business entity definition according to the prior art UDDI specification.

FIG. 2 is a schematic diagram of the main components of an example business entity definition according to the prior art UDDI specification. The business entity definition provides details of services provided to the UDDI registry by a business. The business entity definition comprises a business Entity 201 which includes descriptive information 202 about the business and information about one or more business services which the business entity offers. The descriptive information 202 includes a name and description of the business, one or more identifiers, and one or more categories. The identifiers are used to uniquely identify the business, and the one or more categories are used to identify, for example, the industry type, product type, and geographic location of the business. The information about services which the business offers is in one or more business Service entities 203.

Each business Service entity 203 further provides descriptive and technical information about the service. The descriptive information 204 includes a name and description of the service and one or more categories which apply to service. The technical information comprises one or more binding templates 205 each of which includes a binding description, one or more categories which apply to the binding, one or more references each referring to a technical model (tModel) 207, and an access Point which defines an endpoint address at which the service can be contacted. In UDDI a tModel can be used for a variety of purposes although the main purpose is to provide information which enables a user to make requests to the service defined by the business Service entity which contains it. Accordingly a tModel may include such information as the interfaces and communication protocol which a service supports, although such information may be provided using more than one tModel. Thus, if a service provides more than one binding template it will support more than one method of communicating with it.

Note that FIG. 2 only illustrates a subset of the information which can be defined in an business entity definition, for example the business Entity descriptive information 202 may include contact details. Further FIG. 2 does not describe the complexities associated with some information parts, for example categories. However, such additional information is not relevant to the present invention.

For example an business entity definition which describes a group of web services may comprise a business Entity which specifies: a name of "Abank"; a description of "Abank is a web based bank providing financial services"; categories of "finance" and "UK"; an identifier which includes "plc" and Abank's company registration number; and 3 business Service entities which describe services of accounts, shares, and pensions which the business entity provides. For example the business Service entity which describes the shares service might specify: a name of "shares"; a description of "Abank's share service"; categories of "shares" and "UK"; and two binding templates which define two different methods of accessing the share service, one for buying shares and the other for selling shares. For example the binding template describing the buying shares service might specify: a description of "Abank's share purchase service"; categories of "purchase" and "London Stock Exchange"; an access Point specifying a URL at which the share service can be located; and references to two tModels, one for users which wish to access the service using Simple Object Access Protocol over Hypertext Transfer Protocol (SOAP/HTTP) and the other using Internet Inter-Orb Protocol (IIOP). For example the tModel describing how to access the share buying service using SOAP/HTTP will include: information specifying SOAP/HTTP and a specification of purchase Enquiry, purchase Confirm and purchase Decline requests. Note that the values specified in this example for categories would be from a predefined and well known taxonomy with which the user would be familiar.

Figure 3:
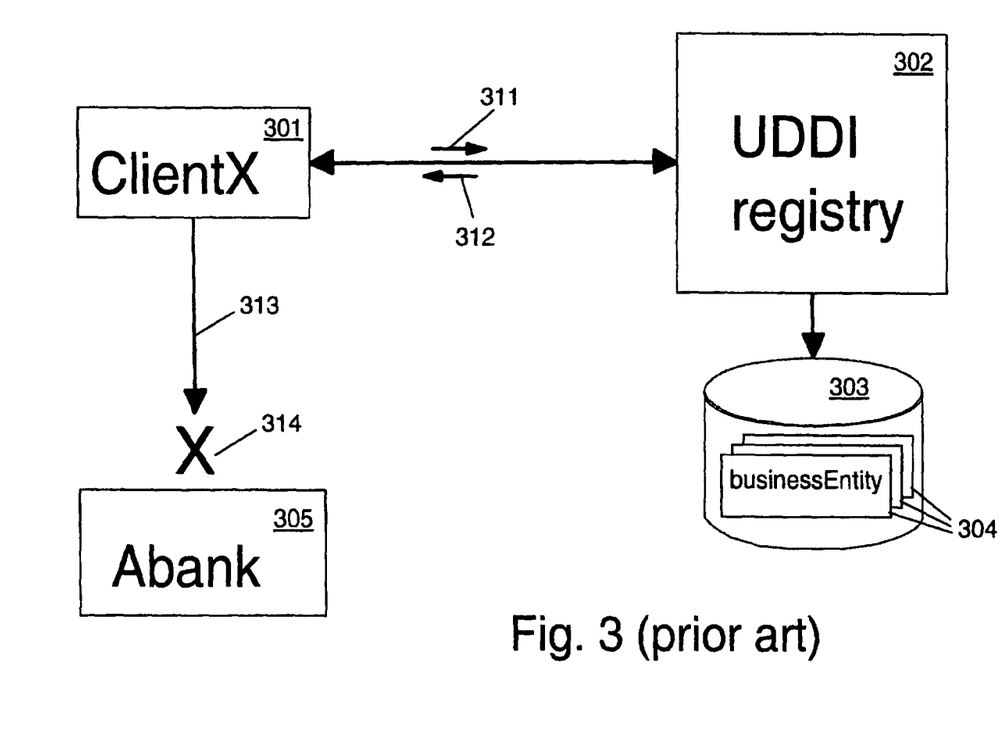
FIG. 3 is a schematic diagram which shows an example of a user attempting to access a business service for which they do not have the required permission to access, according to the prior art UDDI specification.

FIG. 3 is a schematic diagram which shows an example of a user attempting access a service which it does not have permission to access, according to the prior art UDDI specification. The user, using machine ClientX 301, first sends a request (311) to the UDDI Registry 302 which specifies that they wish to obtain details of share buying services available in the UK. The UDDI registry then searches its database 303 of business entity definitions 304 which have been registered with it. It finds several which include the one described above for Abank 305, and returns (312) details of them to Client X 301 for the user. The user prefers to use Abank and elects to communicate using SOAP/HTTP and as a result ClientX 301 sends a purchase Enquiry request (313), using SOAP/HTTP, specifying the user ID of the user, for example "Alex" to Abank 305. However, Abank requires users to complete an off-line registration procedure before accessing its share service and "Alex" has not previously completed this procedure. As a result Abank 305 refuses (314) to handle the purchase Enquiry request received from "Alex" who then receives an error response to the request. The user must now select a different share service, of a different business entity, to use from those previously returned (312) by the UDDI registry 302. Note that the request (311) sent by the user to UDDI registry 302 could also to be to obtain details specifically for Abank.

According to the present invention, in the example of FIG. 3, the user of ClientX 301 has used unnecessary time and resources selecting the Abank service 305 and sending a purchase Enquiry request (313) to it. Further the Abank service 305 has used unnecessary time and resources handling and rejecting the request from the unauthorized user. As a result it would be better if the user was not returned details of a web service, such as provided by Abank, which it is not authorized to access.

According to the preferred embodiment of the present invention an external Access Manager is configured into a UDDI Registry so that an Access Control List (ACL) can be defined for one or more information elements (e.g.: business Entity, business Service Entity etc.) in a business entity definition held in the registry. The ACL is then used to control which users are permitted to see/read, update and/or delete the entity. Note that for update and delete, the ACL overrides the standard UDDI behavior which is that only the user that created the entity can update it or is delete it.

Further note that the ACL can, for example, include identifiers which specify a particular user and/or identifiers which specify a group of users, and further include details for each user or group of users which operation the user is allowed to perform, such as read, update and/or delete.

Figure 4:
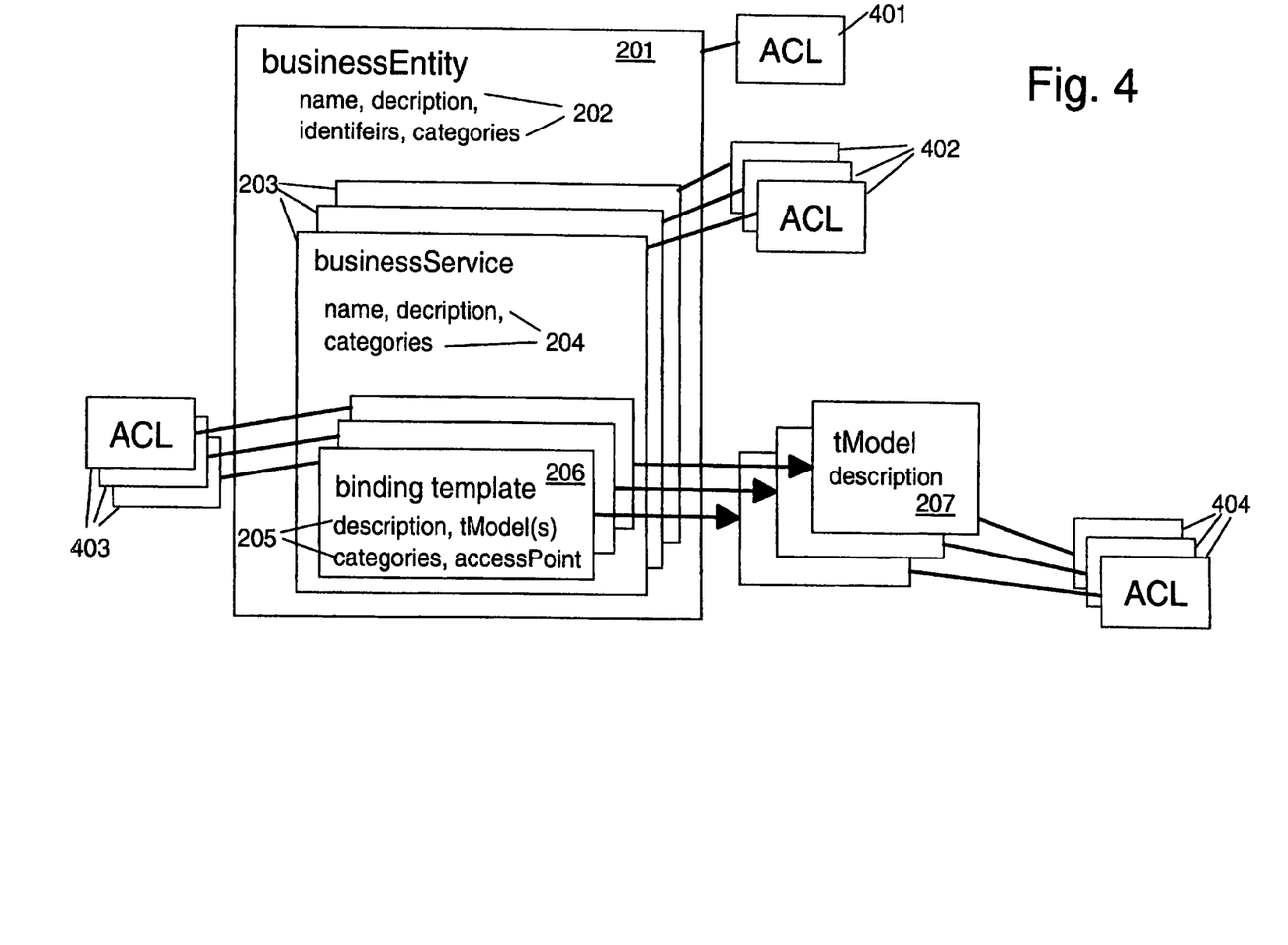
FIG. 4 is a schematic diagram of a business entity definition and associated access control lists, according to the preferred embodiment of the present invention.

FIG. 4 is a schematic diagram of an example business entity definition according to the preferred embodiment of the present invention. The diagram has common parts with FIG. 2 and for which like numbers are used. However the diagram further includes Access Control Lists 401, 402, 403 and 404. An ACL 401 is associated to the business Entity 201 and contains a list of users who can access the Business Entity and descriptive information 202 contained within in it. The business Entity includes several business Service entities 203 each of which is also associated with an ACL 402. A business Service entity requires an ACL 402 if only a subset of the users who can access the business entity definition can access the Business Service entity and therefore an ACL 402 contains a subset of users listed in ACL 401. Within each business Service entity are several binding templates each of which are associated with an ACL 403. A binding template requires an ACL 403 if only a subset of the users who can access the business Service entity can also access the binding template. Within each binding template is a reference to one or more tModels each of which are also associated with an ACL 404. Note that tModels are referenced from, and not included in, a binding template and as a result the same tModel can be referenced from more than one binding template and from different business entity definitions. This means that ACL 404 does not necessarily contain a subset of the users defined in ACL 403 but instead a more general list which can apply to all the business entity definition locations from which it is referenced.

For example, a business entity definition which describes an Xbank business entity which provides account, shares and pensions web services defined in business service entities may have associated ACLs as now described. The bank permits all users from the UK to access its services so the ACL associated with the business Entity specifies a group which defines UK users. However the share service is limited to registered users of which there are 4: Dealer Trusted, Dealer, is Pricer Trusted and Pricer. As a result the ACL associated with the business Service entity which defines the share service lists only these four users. The business Service entity which defines the share service includes two binding templates one for obtaining prices of shares and one for both obtaining prices and dealing in shares. Dealer Trusted and Dealer are dealers and as a result the ACL associated with the binding template for obtaining prices and dealing in shares lists only these two users. Pricer Trusted and Pricer only make price enquiries and as a result the ACL associated with the binding template for obtaining share quotes contains only these two users. The binding template for obtaining prices and dealing in shares contains references to four tModels: tMDealSecure, tMDeal, tMPriceSecure and tMPrice. tMDealSecure and tMDeal describe how to access the dealing function, tMDealSecure using a secured connection and tMDeal using a non-secured connection. tMPricesSecure and tMPrice describe how to access the obtaining prices function, tMPriceSecure using a secured connection and tMPrice using a non-secured connection. The binding template for obtaining prices contains references to two tModels which are tMPriceSecure and tMPrice. Associated with each tModel is an ACL. The ACL for tMDealSecure only lists Dealer who is a not a trusted dealer and so must use a secured connection. The ACL for tMDeal only lists Dealer Trusted who is a secure dealer and trusted to access the service using a non-secured connection. The ACL for tMPriceSecure lists Dealer and Pricer because neither are trusted and so must use a secured connection. Finally the ACL for tMPrice lists Dealer Secure and Pricer Secure because both are secure and trusted to access the service using a non-secured connection.

Note that in another embodiment one or more of the information elements (business Entity, business Service, binding template, tModel) in the hierarchy may not have an associated ACL. In this case, it can be assumed that all users who can access an information element can also access any information element contained within it which does not have an associated ACL. For example if a binding template does not have an associated ACL it is assumed that all users who can access the business Service which contains it can also access the binding template.

In the preferred embodiment the ACLs are associated with the business entity definitions using a virtual file system. For example, in UDDI each information element can be associated with a unique key such that each business Entity, is business Service, binding template and tModel has a unique key. These keys may therefore be used to access an ACL from a directory structure which follows the same hierarchy as the business entity definition. As a result, for example, if the key for the Xbank business entity is "Xbank", the key for a Xbank share business Service entity is "shares", and the key for the share service binding templates are "dealers" and "pricers" the ACLs are placed in a directory structure as follows:
/uddi/Xbank/<ACL for Xbank business Entity>
/uddi/Xbank/shares/<ACL for share business Service>
/uddi/Xbank/shares/dealers/<ACL for dealers binding template>
/uddi/Xbank/shares/pricers/<ACL for pricers binding template>

However, note that for illustrative purposes the keys used in this example are somewhat simplistic and are unlikely to be unique with other business entities. In practice, in order to obtain uniqueness, a key is likely to be more complicated and comprise a UUID (Universal Unique Identifier).

In another embodiment the business entity definition could be updated to include an appropriate ACL or a reference to an appropriate ACL.

Figure 5:
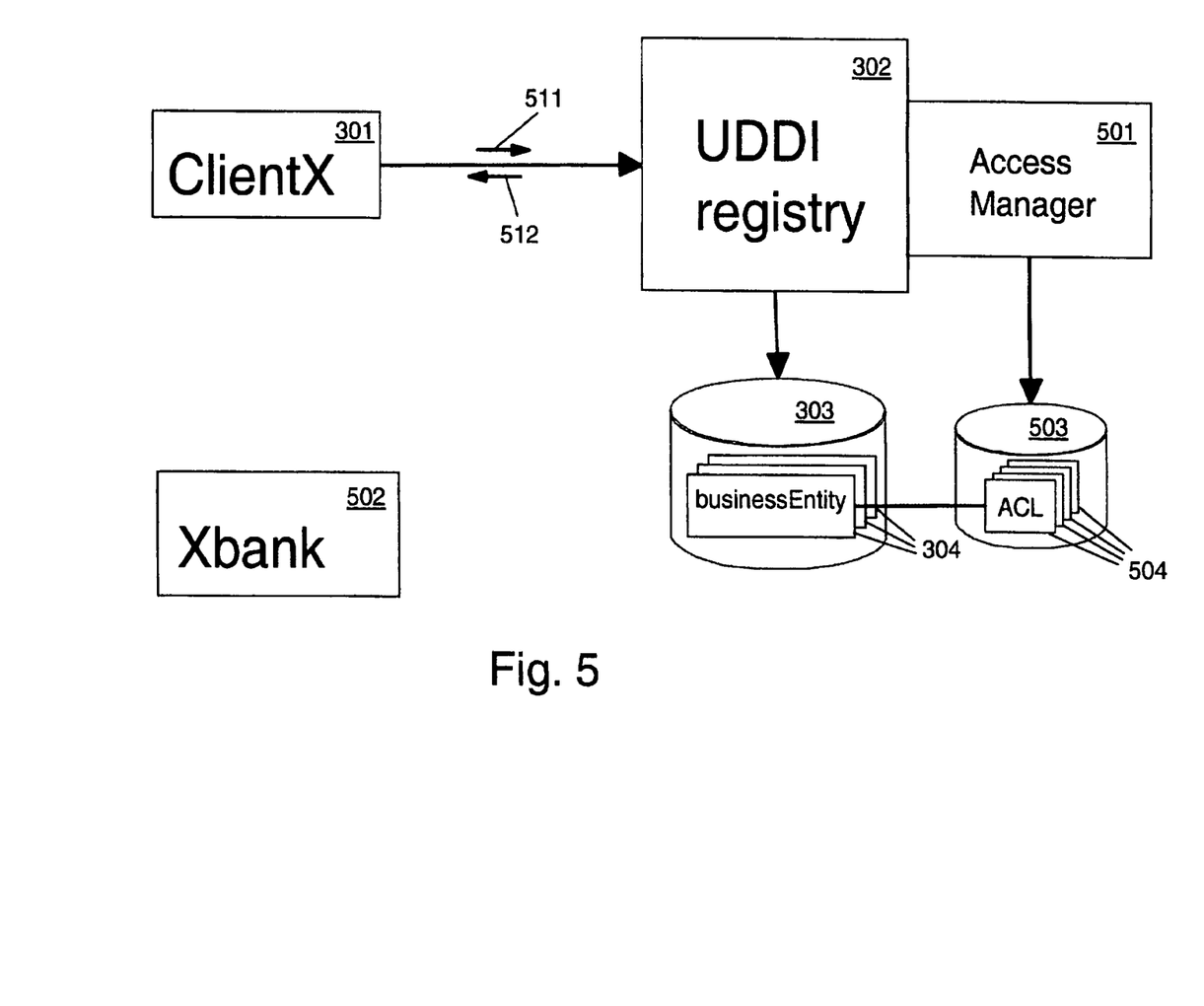
FIG. 5 is a schematic diagram which shows an example of a user attempting access a business service which they do not have permission to access, according to the preferred embodiment of the present invention.

FIG. 5 is a schematic diagram which shows, according to the preferred embodiment of the present invention, an example of a user attempting access a business service which they do not have the required permission to access. The diagram has common parts with FIG. 3 and for which like numbers are used. The user, using machine ClientX 301, first sends a request (511) to the UDDI Registry 302 which specifies that they wish to obtain details of share buying services available in the UK. The user request (511) further includes an identifier for the user, for example "Fred", which is added to a context associated with the flow, for example by middleware running in ClientX 301. The UDDI registry then searches its database 303 of business entity definitions 304, which have been registered with it, for those which provide the service requested. It finds and retains a list of several suitable business entities one of which is Xbank 502. Configured with the UDDI is registry is an Access Manager 501 which the UDDI registry then requests to check each ACL 504 which is associated with any of the relevant information elements in the business entity definitions which it has located. The check uses the user identifier included in the context with the user request (511). For example, with reference to the example above, the Xbank business entity permits access to all users in the UK of which "Fred" is one. However the Xbank share service is not accessible to "Fred" because it only permits access to 4 users, namely: Dealer Trusted, Dealer, Pricer Trusted and Pricer. As a result the Access Manager (501) indicates to the UDDI registry that an authentication has failed and as a result details of Xbank are removed from the list of services returned by the registry. Once the UDDI registry has used the Access Manager to check all business entities in the list it returns (512) to ClientX 301 only those which it has permission to access.

Note that in the example of FIG. 5 the user request is to obtain a list of business entities which satisfy a search criteria. In another embodiment the request could be for details of a specific business entity or to update or delete the XML schema of the business entity.

Further note that it is the responsibility of the business provider to provide to the UDDI registry suitable permission lists, such as ACLs, for its business entity definition(s). As a result, because the UDDI registry and business are likely to be in different security domains and therefore do not have access to the same permission list, the ones available to the UDDI registry may become out of date. As a result it is possible that a user will not be provided with details of service to which he has access or he may be provided with details of a service to which he does not have access.

Figure 6:
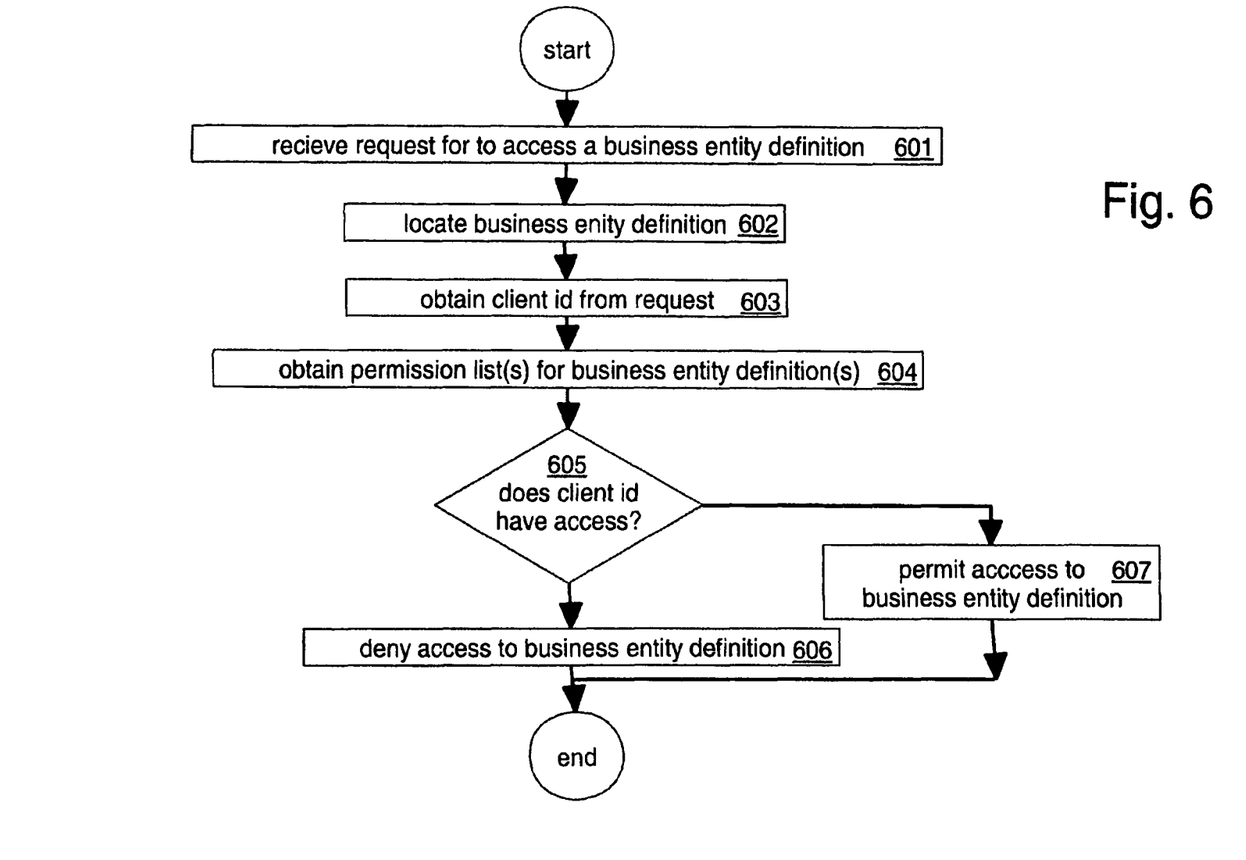
FIG. 6 is a flow chart of an overview of the method followed by a UDDI registry and Access Manager according to the preferred embodiment of present invention.

FIG. 6 is a flow diagram of the main method steps followed by a UDDI registry and access manager according to the preferred embodiment of the present invention. At step 601 a request is received from a user to access a business entity definition. The type of access specified by the request could be to update, delete or read the business entity definition. At step 602 the business entity definition for which access was requested is located and at step 603 an identifier of the user is obtained from information sent, at step 601, with the request. The identifier could be for a particular user or a group of users, and this along with details of the one or more business entity definitions and the type of access sought, are then provided to is the Access Manager. At step 604 the access manager locates permission details associated with the business entity definition, for example by locating them in a virtual file system known to the access manager, and then, at step 605 checks to see if the identified user has, according to the permission details, the required permission to access the business entity definition or one or more information elements contained within it. If the user does not have the required permission the user request is rejected and an error returned at step 606. However if the user does have the required permission the request is permitted access the business entity definition at step 607. It is also possible that the user has limited access to the business entity definition and, if so, step 607 only permits access to the subset of the business entity definition to which the user has access.

Note the flow diagram of FIG. 6 is simplified and the steps do not necessarily have to be carried out in the order specified. For example, given a business entity definition which has a plurality of associated permission details, each for a different information element in the business entity definition, steps 604 and 605 could be carried out in a loop such that permission details are obtained and then checked for each information element in turn. Further if the request is a read request it may specify a search criteria for which the UDDI registry locates one or more business entity definitions which satisfy the criteria. In this case the steps 604, 605, 606 and 607 may be in a loop which check each of the one or more business entity definitions in turn.

Note that a skilled person in the art would realize that the method described with reference to FIG. 6 could be implemented in a variety of programming languages, for example, Java™, C, and C++ (Java is a registered trademark of Sun Microsystems, Inc. in the United States, other countries, or both.). Further a skilled person would realize that once implemented the methods can be stored in a computer program product comprising or more programs, in source or executable form, on a media, such as floppy disk, CD, and DVD, suitable for loading onto a data processing host and causing the data processing host to carry out the methods.

Further note that whilst the invention has been described in terms of a UDDI registry a skilled person would realize that a registry could be implemented, which is not a UDDI registry, but provides a similar function to a UDDI registry.

Thus, according to the present invention a registry, such as a UDDI registry, restricts access to business entity definitions contained in the registry according to permission details associated with the business service definition. A business entity definition may comprise a plurality of information elements. Permission details, which define users or groups of users with permission to access the information element, are then associated with one or more of these information elements. When a user request is received to access a business entity definition access is restricted to only those information elements for which the user has the required permission.

The invention claimed is:

1. A system for controlling user access to a registry of business entity definitions, the system comprising:
   at least one processor;
   a computer readable memory communicatively coupled to said processor having said business entity definitions stored thereon, and
   a network connector to interface the system with a computer network;
   wherein said system is programmed to:
   maintain the registry of business entity definitions, wherein each business entity definition comprises a description of a corresponding business entity, the description of each corresponding business entity comprising a description of at least one business service provided by that business entity, each of said business entity definitions and business service descriptions having different and separate permission details associated therewith;
   receive a request from a user, via the network connector, the request comprising search criteria and requesting to access a corresponding business entity definition in said registry, said business entity definition comprising a plurality of information elements;
   obtain the identity of the user from data associated with the request;
   determine a list of business entity definitions that satisfy the search criteria and whether the user has permission to access that business entity definition and any business service description of that business entity that matched the search criteria;
   in response to said request, filter search results comprising removing from the search results at least one business entity for which it is determined that the user does not have permission for either the corresponding business entity definition or business service description that matched the search criteria; and
   return, via the network connector, the filtered search results.

2. The system of claim 1, wherein each business service description comprises at least one binding template.

3. The system of claim 2, wherein each binding template has a separate and independent access control list to determine whether a user has permission to access that binding template within the business entity definition.

4. The system of claim 3, wherein each binding template comprises a binding description that includes at least one reference to a technical model and an access point that defines an endpoint address at which the corresponding business service is contacted.

5. The system of claim 1, wherein the system is further configured to:
   locate the permission details in a file system in which the permission details are in a location in the file system which is defined according to an information element with which they are associated.

6. The system of claim 1, wherein the registry is a Universal Description, Discovery and Integration (UDDI) registry.

7. The system of claim 1, further comprising an Access Control List (ACL) associated with each business entity definition.

8. The system of claim 7, further comprising an additional ACL associated with each of the information elements within the business entity definition.

9. The system of claim 7, wherein each information element has a specific ACL associated therewith when not all users who are authorized to access the business entity definition also have permission to access that information element.

10. The system of claim 1, wherein the information elements comprise UDDI businessService entities, each of which is associated with a different Access Control List (ACL).

11. The system of claim 1, wherein at least one of the information elements comprises a plurality of binding templates, each binding template having a separate Access Control List (ACL).

12. The system of claim 11, wherein each binding template provides a reference to one or more Universal Description, Discovery and Integration (UDDI) technical models (tModels) each of which is also associated with a separate ACL.

13. The system of claim 1, wherein each business entity definition and each information element has a respective Access Control List (ACL) and wherein all the ACLs are associated with the business entity definitions using a virtual file system.

14. A server computer hosting and controlling user access to an electronic registry of business entity definitions available via a computer network in response to user requests to access business entity definitions and individual information elements therein, the server comprising a processor, volatile and non-volatile electronic memory and a network interface, wherein the server is programmed for:
   maintaining the registry of business entity definitions, wherein each business entity definition comprises a description of a corresponding business entity, the description of each corresponding business entity comprising a description of at least one business service provided by that business entity, each of said business entity definitions and business service descriptions having different and separate permission details associated therewith;
   receiving a request from a user via the network connector, the request comprising search criteria and requesting to access a corresponding business entity definition in said registry, said business entity definition comprising a plurality of information elements;

obtaining the identity of the user from data associated with the request;

determining a list of business entity definitions that satisfy the search criteria and whether the user has permission to access that business entity definition and any business service description of that business entity that matched the search criteria;

in response to said request, filter search results comprising removing from the search results at least one business entity for which it is determined that the user does not have permission for either the corresponding business entity definition or business service description that matched the search criteria; and returning, via the network connector, the filtered search results.

15. The server computer of claim 14, wherein each business service description comprises at least one binding template and each binding template has a separate and independent access control list for determining whether the user has permission to access that binding template within the business entity definition.

16. The server computer of claim 15, wherein each binding template comprises a binding description that includes at least one reference to a technical model and an access point that defines an endpoint address at which the corresponding business service is contacted.

17. The server of claim 14, further comprising an Access Control List (ACL) associated with each business entity definition.

18. The server of claim 17, further comprising an additional ACL associated with each of the information elements within the business entity definition.

* * * * *